(12) United States Patent
Rowe et al.

(10) Patent No.: US 11,694,438 B2
(45) Date of Patent: Jul. 4, 2023

(54) SCALABLE EXTENDED REALITY VIDEO CONFERENCING

(71) Applicant: Carnegie Mellon University, Pittsburgh, PA (US)

(72) Inventors: Anthony Rowe, Pittsburgh, PA (US); Michael Farb, Pittsburgh, PA (US); Ivan Liang, Pittsburgh, PA (US); Edward Lu, Pittsburgh, PA (US); Nuno Pereira, Pittsburgh, PA (US); Eric Riebling, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 17/685,869

(22) Filed: Mar. 3, 2022

(65) Prior Publication Data
US 2022/0286311 A1     Sep. 8, 2022

Related U.S. Application Data

(60) Provisional application No. 63/156,426, filed on Mar. 4, 2021.

(51) Int. Cl.
| | | |
|---|---|---|
| *G06T 15/10* | (2011.01) | |
| *G06V 20/20* | (2022.01) | |
| *G06T 19/00* | (2011.01) | |
| *H04S 7/00* | (2006.01) | |
| *H04L 12/18* | (2006.01) | |
| *H04L 65/403* | (2022.01) | |
| *H04L 65/60* | (2022.01) | |

(52) U.S. Cl.
CPC .............. *G06V 20/20* (2022.01); *G06T 15/10* (2013.01); *G06T 19/006* (2013.01); *H04L 12/1827* (2013.01); *H04L 65/403* (2013.01); *H04S 7/303* (2013.01); *G06T 2219/024* (2013.01); *H04L 65/60* (2013.01); *H04S 2400/11* (2013.01); *H04S 2400/13* (2013.01)

(58) Field of Classification Search
CPC ................................ G06V 20/20; G06T 15/10
USPC ......................................................... 709/204
See application file for complete search history.

(56) References Cited

U.S. PATENT DOCUMENTS

2020/0167883 A1*  5/2020  Yamashita ........... G06Q 10/047
2022/0028366 A1    1/2022  Kephart et al.
(Continued)

OTHER PUBLICATIONS

Clark et al., "Hierarchical Geometric Models for Visible Surface Algorithms," Commun. ACM 19, 10, Oct. 1976, pp. 547-554.
(Continued)

*Primary Examiner* — Sibte H Bukhari
(74) *Attorney, Agent, or Firm* — Stanek Lemon Crouse & Meeks, P.A.

(57) ABSTRACT

Some embodiments of the present inventive concept provide for improved telepresence and other virtual sessions dynamic scaling and/or assignment of computing resources. An XR telepresence platform can allow for immersive multi-user video conferencing from within a web browser or other medium. The platform can support spatial audio and/or user video. The platform can scale to hundreds or thousands of users concurrently in a single or multiple virtual environments. Disclosed herein are resource allocation techniques for dynamically allocating client connections across multiple servers.

16 Claims, 8 Drawing Sheets

(56) References Cited

U.S. PATENT DOCUMENTS

2022/0124286 A1    4/2022  Punwani et al.
2022/0292543 A1*   9/2022  Henderson ......... G06Q 30/0269

OTHER PUBLICATIONS

Fuchs et al., "On Visible Surface Generation by a Priori Tree Structures*" ACM, 1080, pp. 124-133.
Pereira et al., "ARENA: The Augmented Reality Edge Networking Architecture," Proceedings of the IEEE/ACM International Symposium on Mixed and Augmented Reality (ISMAR'21). 2021, 10 pages.
WebXR Device API, W3C Working Draft, Feb. 8, 2022, https://www.w3.org/TR/webxr/, 96 pages.
Sergio Orts-Escolano, et al., "Holoportation: Virtual 3D Teleportation in Real-Time", UIST 2016, Oct. 16-19, 2016, pp. 741-754 (Year: 2016).
G. Cernigliaro, et al., "Extended Reality Multipoint Control Unit—XR-MCU Enabling Multi-user Holo-conferencing via Distributed Processing", International Broadcasting Convention IBC 2020, Sep. 2020, pp. 1-9 (Year: 2020).
T. Piumsomboon, et al., "Mini-Me: An Adaptive Avatar for Mixed Reality Remote Collaboration", CHI 2018, Apr. 21-26, 2018, Montreal, QC, Canada, p. 46, pp. 1-13 (Year: 2018).
B. Jones, et al., "Belonging There: VROOM-ing into the Uncanny Valley of XR Telepresence", Proc. ACM Hum—Comput. Interact., vol. 5, No. CSCW1, Article 59, Publication date: Apr. 2021, p. 59:1-59:31 (Year: 2021).

* cited by examiner

SCALABLE EXTENDED REALITY VIDEO CONFERENCING

RELATED APPLICATIONS

Any and all applications for which a foreign or domestic priority claim is identified in the Application Data Sheet as filed with the present application are hereby incorporated by reference and made a part of this specification. The present application claims the benefit of and priority to U.S. Provisional Patent Application No. 63/156,426, filed on Mar. 4, 2021, entitled SCALABLE VIRTUAL REALITY VIDEO CONFERENCING, the disclosure of which is hereby incorporated herein by reference in its entirety.

This application is being filed on Mar. 3, 2022 concurrently with the following U.S. patent application, which is incorporated by reference herein in its entirety:

| Patent Application Title | Filing Date | U.S. application Ser. No. |
|---|---|---|
| AUDIO AND VIDEO MANAGEMENT FOR EXTENDED REALITY VIDEO CONFERENCING | 3 Mar. 2022 | 17/685,816 |

GOVERNMENT CONTRACT

This inventive concept was made with government support under Grant No. HR0011-18-3-0004 awarded by the Department of Defense/Defense Advanced Research Projects Agency (DARPA). The government has certain rights in the invention.

FIELD

The present inventive concept relates to extended reality imaging and visualization systems, dynamically adjusting audio and/or video qualities in a telepresence session, and/or dynamically scaling computing resources to facilitate a reliable telepresence session.

BACKGROUND

Modern computing and display technologies have facilitated the development of systems for so called extended reality (XR), which is a common umbrella term referring to any combination of "virtual reality," "augmented reality," or "mixed reality" experiences, wherein digitally reproduced images or portions thereof are presented to a user in a manner wherein they seem to be, or may be perceived as, real. A virtual reality ("VR") scenario typically involves presentation of digital or virtual image information without transparency to other actual real-world visual input; an augmented reality ("AR") scenario typically involves presentation of digital or virtual image information as an augmentation to visualization of the actual world around the user; and a mixed reality ("MR") scenario typically involves merging real and virtual worlds to produce new environments where physical and virtual objects co-exist and interact in real time.

An avatar may be a virtual representation of a real or fictional person (or creature or personified object) in an XR environment. For example, during a telepresence session in which two XR users are interacting with each other, a viewer can perceive an avatar of another user in the viewer's environment and thereby create a tangible sense of the other user's presence in the viewer's environment. The avatar can also provide a way for users to interact with others in a shared virtual environment.

XR technology is complex and presents numerous challenges in terms of interface design, security, and scalability, particularly with respect to three-dimensional (3D) telepresence sessions.

SUMMARY

Some embodiments of the present inventive concept provide for improved telepresence and other virtual sessions using localized projection of audible noises, dynamic adjustment of audio and/or video qualities based on spatial relationships between users, and/or dynamic scaling and/or assignment of computing resources. An XR telepresence platform can allow for immersive multi-user video conferencing from within a web browser or other medium. The platform can support spatial audio and/or user video. The platform can scale to hundreds or thousands of users concurrently in a single or multiple virtual environments. Disclosed herein are quality-of-service techniques for dynamically selecting or modifying audio and/or video traffic. Disclosed herein are resource allocation techniques for dynamically allocating client connections across multiple servers.

BRIEF DESCRIPTION OF THE DRAWINGS

The present inventive concept is illustrated by way of example, and not limitation, in the figures of the accompanying drawings, in which like reference numerals indicate similar elements.

DETAILED DESCRIPTION

Figure 1:
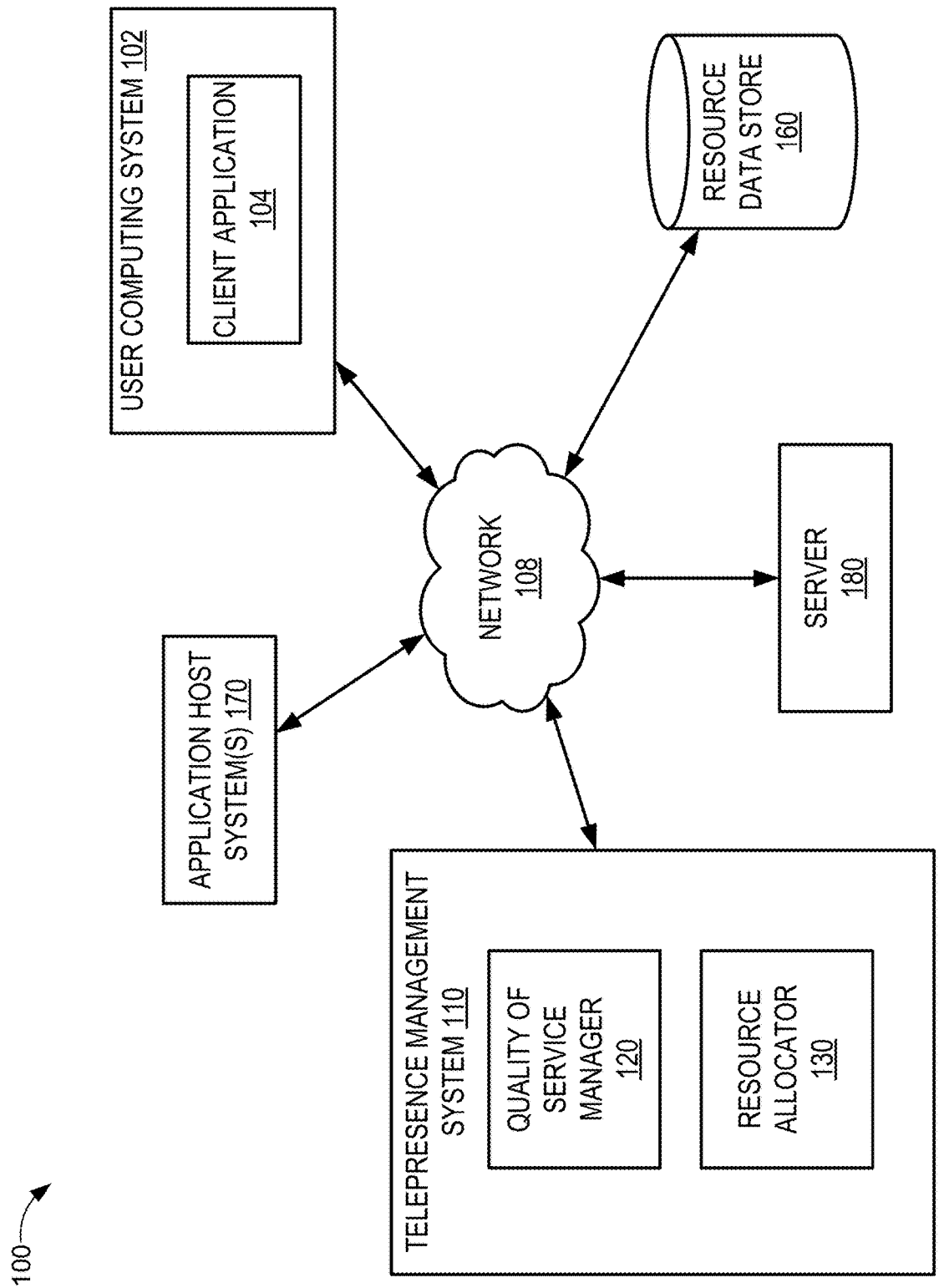
FIG. 1 illustrates an environment for enabling and/or facilitating one or more XR telepresence sessions in accordance with some embodiments of the present inventive concept.

Video telepresence systems often flatten user attention equally across all participants with a grid of videos, or alternatively focus attention on a single active speaker. This falls short of real-world conversations and can more rapidly lead to fatigue. An extended reality (XR) telepresence session can provide an alternative where users can interact in an immersive 3D environment. However, an XR telepresence session presents challenges in terms of interface design, security, and scalability, at least due to bandwidth-limited on both clients and individual servers. For example, it can be desirable for a XR telepresence system to support tens, hundreds, or thousands of users independently exploring the XR worlds, while concurrently supporting interactions (e.g., audio and/or video transmissions) between users. Furthermore, it can be desirable for latency between users' interactions to be imperceptible.

To address these and other concerns, a telepresence management system is disclosed. The telepresence management system can implement a streaming quality-of-service (QoS) system that performs frustum video culling and distance-based QoS link estimation based on a user's location within the virtual world. In addition or alternatively, the telepresence management system can provide a resource allocator that operates on the communication graph between users to load balance and optimize server-client assignments to maintain the efficient communication linkages while minimizing setup connection latency.

In light of the description herein, it will be understood that the embodiments disclosed herein substantially improve telepresence scalability and resource utilization. Specifically, the embodiments disclosed herein enable a QoS manager to dynamically modify audio and/or video characteristics based on spatial relationships between the avatars of a telepresence session. In addition or alternatively, the QoS manager can dynamically modify video characteristics based on frustum culling and/or spatial relationship. In this way, users who are far away and/or out of sight are not streaming their video to each other, thereby saving bandwidth. Furthermore, users that are close may be heard and/or seen at varying volumes and video qualities. By limiting which audio and/or video to transmit between users (and/or controlling the quality of the audio and/or video), the QoS manager advantageously reduces the complexity of renderings, since it avoids or reduces the complexity associated with out of view computations. Furthermore, embodiments disclosed herein enable a resource allocator to dynamically allocate client connections across multiple servers, while reducing perceived connectivity breakages and limiting complexity associated with clients managing multiple server connections.

Thus, the present inventive concept represents an improvement at least in the functioning of extended reality imaging and visualization systems. Moreover, the presently disclosed embodiments address technical problems inherent within the XR telepresence environments. These technical problems are addressed by the various technical solutions described herein, including the dynamic generation of video and/or audio stream based on spatial relationships and frustum culling, as well as the dynamic generation of server allocation maps.

Although the telepresence session embodiments described herein are generally described as including a few client connections, it will be understood that a telepresence session can include many more client connections, such as tens, thousands, or millions of client connections. For example, in some embodiments, the telepresence management system may perform the routine 400 of FIG. 4 or routine 900 of FIG. 9 for tens, thousands, or millions of client connections across tens, thousands, or millions of servers concurrently or successively.

Environment Overview

FIG. 1 illustrates an environment 100 for enabling and/or facilitating one or more XR telepresence sessions in accordance with some embodiments of the present inventive concept. The environment 100 includes a user computing system 102, a network 108, a telepresence management system 110, a resource data store 160, an application host system 170, and a server 180. To simplify discussion and not to limit the present disclosure, FIG. 1 illustrates only one user computing system 102, resource data store 160, telepresence management system 110, application host system 170, and server 180, though multiple may be used.

Any of the foregoing devices, components, or systems of the environment 100 may communicate via the network 108. Although only one network 108 is illustrated, multiple distinct and/or distributed networks 160 may exist. The network 108 can include any type of communication network. For example, the network 108 can include one or more of a wide area network (WAN), a local area network (LAN), a cellular network (e.g., LTE, HSPA, 3G, and other cellular technologies), an ad hoc network, a satellite network, a wired network, a wireless network, and so forth. In some embodiments, the network 108 can include the Internet.

Any of the foregoing components or systems of the environment 100, such as any one or any combination of the user computing system 102, the telepresence management system 110, the resource data store 160, or the server 180 may be implemented using individual computing devices, processors, distributed processing systems, servers, isolated execution environments (e.g., virtual machines, containers, etc.), shared computing resources, or so on. Similarly, any of the components of the telepresence management system 110, such as any one or more of the quality-of-service (QoS) manager 120 or the resource allocator 130, may be implemented using individual or combined computing devices, processors, distributed processing systems, servers, isolated execution environments, shared computing resources, or so on. For example, any one or more of the QoS manager 120 or the resource allocator 130 can have certain resources (e.g., memory, processor, etc.) of the underlying host computing system assigned to it but may share the same operating system and may use the operating system's system call interface and/or or may share other compute resources. In certain cases, any one or more of the QoS manager 120 or the resource allocator 130 can be implemented within an isolated execution environment on the host computing device, where the isolated execution environment provides a memory space of the host computing device that is logically isolated from memory space of other isolated execution environments. Further, any one or more of the QoS manager 120 or the resource allocator 130 may run the same or different computer applications concurrently or separately and may interact with each other. It will be understood that various virtualization techniques can be used to implement the any one or more of the QoS manager 120 or the resource allocator 130. For example, any one or more of the QoS manager 120 or the resource allocator 130 can be implemented using virtual machines using full virtualization or paravirtualization, etc. Furthermore, any of the foregoing components or systems of the environment 100 may be combined and/or may include software, firmware, hardware, or any combination(s) of software, firmware, or hardware suitable for the purposes described.

The client application 104 may facilitate an XR experience, such as a telepresence session. For purposes of this application, a telepresence session may broadly refer to any XR, MR, AR, or VR environment during which two or more users can interact with each other. In some embodiments, during a telepresence session, a user can perceive an avatar of another user in the user's environment and thereby create a tangible sense of the other user's presence in the viewer's environment. For example, the client application 104 may provide an interface through which a user can interact with one or a few other users, such as a one-on-one or small teleconferencing call. In addition or alternatively, the client application 104 may provide an interface through which a user can interact with tens, hundreds, or thousands of other users, such as the case of a speaker or band performing to tens of thousands of users in the audience, or a user present in a virtual world at the same time with other users.

The interface can facilitate simple movement. In some embodiments, the user moves through the 3D environment with mouse movements, keyboard arrow and WASD keys for physical keyboard devices, and with touchscreen swipes, long press, and accelerometer rotations for mobile devices and VR headsets. In this way, users can alter their perspective to pan, rotate, tilt and travel through the environment. By default, all movement height can be set slightly above the ground at roughly the same height a user 'sees' while walking along the ground.

The interface can facilitate teleconferencing. For example, the interface can include a collapsed video control panel. For example, the interface can provide buttons for the user to enable or disable their (top to bottom) microphone, camera, facial recognition avatar, or expand to less frequently used controls. In some embodiments, the interface includes a video preview box that shows the user what camera view will be transmitted for ease of framing. Less frequent, advanced controls can be collapsed by default.

The interface can facilitate advanced movement. For example, expanded right-hand controls can offer the opportunity to change the speed of forward or reverse movement to slow, medium (e.g., default), or fast. A 3D environment can introduce spatial discomfort, and multiple speeds are needed to accommodate novice and sophisticated users. Also, the ability to effectively 'fly' can be offered, to allow the user to unlock their movement height and travel high above or below the ground plane.

The interface can facilitate screensharing. In some embodiments, the interface enables a user to share one's screen to present slides or other material from the desktop. The shared screen can be mapped onto one or multiple 3D surfaces, commonly a large 16:9 ratio rectangle users may gather around. Other interesting screenshare shapes are possible, including a Ziggurat-style pyramid allowing users to view each other's video cubes as well as the presentation.

The interface can facilitate authentication. For example, the interface can include a logout button and/or settings panel providing access and control of credentials the user provided to authenticate themselves, as well as links to the list of permissions they are authorized to use. The settings panel can offer a chance to customize the name used to present to others for a myriad of personal and professional reasons.

The interface can facilitate facial recognition. A facial avatar button can enable analyzing the user's camera feed for facial recognition feature points. These facial tracker points can be overlaid on the user's video preview box in red lines, in real time. The feature points can be used to render a 3D deformable, rigged facial model of a user for other users' view. It can translate a user's real facial expressions into the same 3D model expressions.

The interface can facilitate scanned reality. For example, the client application 104 can allow import of scanned models of real-world spaces, such as the lab office space shown. Large 3D models scanned real-world spaces, and panoramic 360-degree photography can be supported, depending on the desired degree of augmented reality, or simulated virtual reality.

The interface can facilitate a user transporter. In the potentially large 3D world where users can spread out, there may be a need to communicate and relocate to landmarks or other users. As such, the interface can include a User Transport control panel. In some embodiments, the interface can include a Chat button, for example to allow writing messages to all or specific users in this scene. In some embodiments, the XF interface can include a user list button, which can show a list of some or all users in a scene and/or other users in public scenes on the same or a different server. The User List can allow mute requests to users and the ability to teleport directly in front of any listed user's location to help connect lost users. In some embodiments, the XF interface can include a Landmarks button, which can offer an optional method of listing points of interest to teleport to in large scenes.

The client application 104 may include a web browser, a mobile application or "app," a background process that performs various operations with or without direct interaction from a user, or a "plug-in" or "extension" to another application, such as a web browser plug-in or extension. Although FIG. 1 illustrates the client application 104 as being implemented on the user computing system 102, it will be understood that any of the components or systems of the environment 100 may host, execute, or interact with the client application 104. Furthermore, in some embodiments, the client application 104 may be hosted or executed by one or more host devices, such as the application host system 170, which may broadly include any number of computers, virtual machine instances, and/or data centers that are configured to host or execute one or more instances of the client application 104.

The user computing system 102 represents any computing device capable of interacting with or running the client application 104. Examples of client devices 102 may include, but are not limited to, smart phones, tablet computers, handheld computers, wearable devices, laptop computers, desktop computers, video calling hubs, servers, portable media players, gaming devices, and so forth.

The user computing system 102 can include a client application 104 installed thereon. The user computing system 102 can execute the client application 104 based on software code stored at least in part on the user computing system 102. The client application 104 may also be referred to herein as a telepresence conferencing application, a telepresence application, a videoconferencing application, or the like. The client application 104 should be understood to include software code that the computing device 102 can use to provide or access a telepresence session. The client application 104 may include software code that informs the user computing system 102 of processor instructions to execute but may also include data used in the creation or participation of a telepresence session, such as data relating to simulation, rendering, animation, and other telepresence data. In the illustrated embodiment, when executed, the client application 104 is configured to generate a virtual environment for a user to interface with the client application 104.

In some embodiments, the client application 104 may be stored or executed in a distributed environment using a client/server architecture. For example, the user computing system 102 may execute a portion of a client application 104 and the application host system 170 may execute another portion of the client application 104. For instance, the client application 104 may be an online telepresence session for hundreds or thousands of users that includes a client portion executed by the user computing system 102 and a server portion executed by one or more application host systems 170. As another example, the client application 104 may be a massively multiplayer online role-playing game (MMORPG) that includes a client portion executed by the user computing system 102 and a server portion executed by one or more application host systems 170. For the present discussion, the client application 104 can execute locally on the user computing system 102, can execute as a distributed application that includes a portion that executes on the user computing system 102 and a portion that executes on at least one of the application host systems 170, or can execute on the application host system 170.

The client application 104 can include or be associated with a XR interface. In some embodiments, the XR interface can operate in desktop browsers as well as WebXR compatible browsers. The XR interface can facilitate and support a novel 3D user experience.

The QoS manager 120 can be used to manage the audio and/or video streams provided to each of the client connections (sometimes referred to as users). As described herein, users can join a telepresence session that includes a plurality of other users. In some embodiments, each user can virtually appear (e.g., via an avatar, microphone, camera, etc.) in the telepresence session so that each user has the potential to interact with one or more other users. Given that each user's interactions in the 3D telepresence session is from a unique perspective, in some embodiments, the QoS manager 120 can manage individual audio and/or video streams to each user. As with real life conversations, conversations and/or interactions in the 3D telepresence session can vary largely based on the proximity of users. For example, the QoS manager 120 can prioritize audio and/or video traffic of closer users over audio and/or video traffic of users that are further away. In this way, the telepresence session can scale to tens, hundreds, or thousands of users.

The resource allocator 130 can be used to manage resource (e.g., server-client) assignments within the telepresence management system 110 and/or within a particular telepresence session. For example, the resource allocator 130 can maintain a resource data store 160 with information relating to mappings between servers and client connections. In the event the number of available servers changes (e.g., a server fails, a server is spun up, a server is spun down), the resource allocator 130 can be used to modify the mappings in response to the change.

The resource allocator 130 can be communicatively coupled to one or more components of the environment 100, such as any combination of one or more of the user computing systems 102, the client application 104, the application host system 170, servers 180, the resource data store 160, and/or the telepresence management system 110. For example, the resource allocator 130 can receive or communicate server allocation map identifiers, server identifiers, client identifiers, etc. from one or more components of the environment 100 and can maintain at least some of this information in the resource data store 160.

In some embodiments, the resource allocator 130 can manage data relating to servers of the environment 100. For example, the resource data store 160 can maintain a different server identifier (sometimes referred to as a server identifier) for each server 180. In some embodiments, if a server 180 becomes unresponsive or unavailable, the resource allocator 130 can update the resource data store 160 to remove a server identifier associated with that server 180 or update a table to indicate that the server 180 is not available. As a corollary, if an additional server 180 is detected (e.g., generated), the resource allocator 130 can update the resource data store 160 to include a server identifier associated with that server 180. In this way, the resource data store 160 can include up-to-date information relating to which servers 180 are included and/or available/unavailable. Furthermore, in some embodiments, the resource allocator 130 can receive or maintain status identifiers of the servers. For example, the resource allocator 130 may receive updates regarding server availability or unavailability. In some embodiments, the resource allocator 130 can maintain the server identifiers or status identifiers by receiving status update communications or "heartbeats" from the servers 180.

In some embodiments, the resource allocator 130 can manage assignments between client connections and servers of the environment 100. For example, the resource allocator 130 can create or manage server allocation maps, which can indicate assignments between client connections and servers for hosting the client connections.

As another example, the resource allocator 130 can manage information relating to the client connections of the environment 100. For example, the resource allocator 130 can create or manage conversation maps, which indicate conversation clusters between different client connections. For example, in some embodiments, a conversation map can indicate which client connections are included in a particular conversation cluster.

In some embodiments, the resource allocator 130 can manage the client connections of the telepresence using a combination of the server allocation maps and conversation maps. As a non-limiting example, a server allocation map can indicate an assignment of a first conversation cluster to a first server, and a conversation map can indicate an association between a plurality of client connections. In some such embodiments, based on the association of the first server with the first conversation cluster and the association of the first conversation cluster with the plurality of client connections, the resource allocator 130 can use the server allocation map and the conversation map to determine that the first server is to be responsible for the plurality of client connections.

In some embodiments, the resource allocator 130 can manage location information. For example, the resource allocator 130 can maintain the resource data store 160 with information regarding where client connections (or avatars associated with the client connections) are located in the 3D telepresence environment.

As mentioned, the resource allocator 130 can maintain the resource data store 160. The resource allocator 130 can populate the resource data store 160 and/or update it over time with the data that it determines from the servers 180 and/or user computing systems 102. For example, as information changes, the resource allocator 130 can update the resource data store 160. In this way, the resource data store 160 can retain an up-to-date database of information.

In some embodiments, the resource allocator 130 can maintain the resource data store 160 by pinging the servers 180 for information or passively receiving it based on the servers 180 independently reporting the information. For instance, the resource allocator 130 can ping or receive information from the servers 180 at predetermined intervals of time, such as every X number of seconds, or every X minute(s), etc. In addition or alternatively, the servers 180 can be configured to automatically send their data to the resource allocator 130 and/or the resource allocator 130 can ping a particular server 180 after the passage of a predetermined period of time (for example, every X number of seconds or every X minutes) since the resource allocator 130 requested and/or received data from that particular server 180. In some embodiments, the servers 180 can communicate data to the resource allocator 130 responsive to a particular event.

In some embodiments, the resource allocator 130 can maintain the resource data store 160 by receiving status update communications from user computing systems and/or the client connections. Status update communications or "heartbeats" can occur periodically or according to a schedule, policy, or algorithm. For example, a time-based schedule may be used so that heartbeats may be performed every X number of seconds, or every X minute(s), and so forth.

The resource data store 160 can include or be implemented as cloud storage, such as Amazon Simple Storage Service (S3), Elastic Block Storage (EBS) or CloudWatch, Google Cloud Storage, Microsoft Azure Storage, InfluxDB, etc. The resource data store 160 can be made up of one or more data stores storing data that has been received from one or more of the user computing system 102, the client application 104, the telepresence management system 110, and/or the server 180. The resource data store 160 can be configured to provide high availability, highly resilient, low loss data storage. The resource data store 160 can include Amazon CloudWatch metrics. In some embodiments, to provide the high availability, highly resilient, low loss data storage, the resource data store 160 can store multiple copies of the data in the same and different geographic locations and across diverse types of data stores (e.g., solid state, hard drive, tape, etc.). Further, as data is received at the resource data store 160 it can be automatically replicated multiple times according to a replication factor to different data stores across the same and/or different geographic locations.

Avatar Design

As described herein, multiple avatars may interact with each other in an immersive 3D environment that is part of an XR telepresence session. Like interactions in the real world, avatars may approach or interact with other avatars from virtually any direction. For example, a first avatar may approach a second avatar from behind, from the side, from the front, etc. In contrast to real world interactions, where one can easily visually ascertain when they are approaching someone from behind, such a determination may not be as easy in a virtual environment. This is because many systems utilize a limited number of image capture devices, and may, for example, only receive an image or video of the user's face. In such a scenario, an approach from the rear may nevertheless result in a view of the user's face. This can be confusing to the approaching user and can hinder interactions between the two. To address these and other concerns, the telepresence management system 110 can capture the spatial properties of users in virtual environments.

Figure 2A:
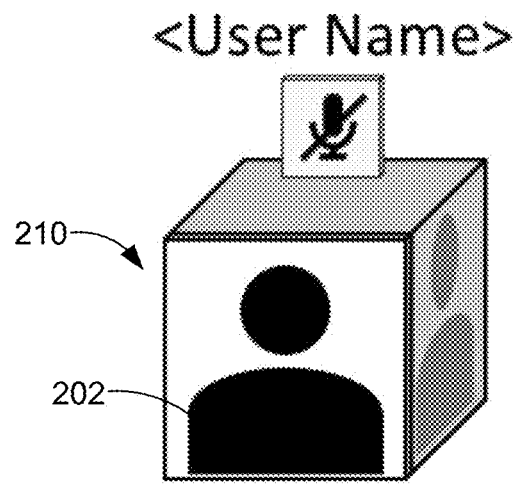
FIGS. 2A and 2B illustrate example avatars in accordance with some embodiments of the present inventive concept.
Figure 2B:
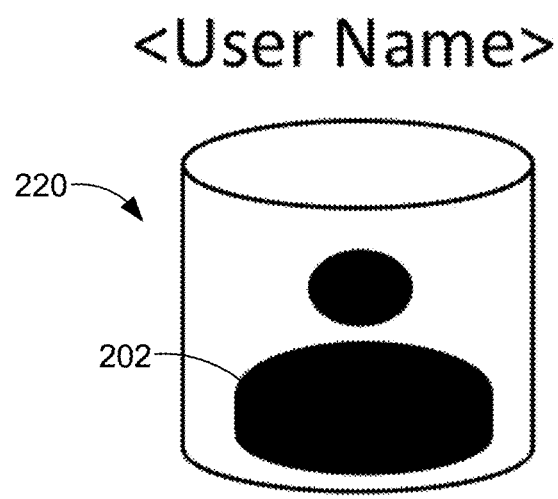

FIGS. 2A and 2B illustrate example avatars 210, 220. As shown, each of the avatars 210, 220 are implemented as a 3D object (a cube and cylinder, respectively). Furthermore, each of the avatars 210, 220 include a representation 202 of a user, which can include an image of the user, a real-time video stream of the user, or the like.

In some embodiments, as shown in FIG. 2A, the representation 202 may be visible from multiple sides of the avatar 210, but may vary in quality or nuance, depending on how the user is oriented. For example, as shown in FIG. 2A, the front side of the avatar 210 is highlighted to show the direction the user is facing, while the other sides are darkened. In this way, a rear-approaching user can use visual cues to determine which user they are approaching and from which direction they are approaching. In this way, the avatars 210, 220 provide visual cues to other users as to which direction the user is facing.

In some embodiments, the telepresence management system 110 can provide different data (e.g., different video resolution, different audio volume, etc.) around on each side of the avatar. In this way, some properties of the user and/or the representation 202 may not be visible on all sides of the avatars 210, 220. For example, continuing with the example above, subtle social cues (e.g., lip movement, etc.) may only be visible or discernible when facing the user.

Although the avatars FIGS. 2A and 2B are illustrated as video texture-mapped a cube and a cylinder, respectively, these shapes should not be construed as limiting. For example, an avatar may be any graphical representation of a user or the user's character or persona, and may be appear in the form of one or more shapes, objects, etc. As another example, in some embodiments, an avatar may have a human- or animal-looking appearance. Furthermore, although generally described with respect to avatars, it will be understood that the disclosure herein can be applied to virtual/real objects, scenes, etc.

Frustum Video Culling

Conventional audio/video teleconferencing may not scale well to tens or hundreds of users with simultaneous two-way video/audio. To address challenges associated with creating scalable telepresence system, disclosed herein are filtering techniques that take advantage of the 3D environment, where interactions have similarities to real-world interactions. In particular, the techniques can include providing users with some, but not necessarily all video, of other users, or a reduced video quality of some users. For example, the telepresence management system 110 may only provide video to a user of other users within their field of view and/or within a particular distance. As another example, the telepresence management system 110 may downgrade the video quality (or eliminate the video feed) from distant users and/or improve the video quality of nearby users in the field of view. In some embodiments, this is referred to as frustum video culling or a view frustum. A view frustum advantageously reduces the complexity of rendering, since it avoids or reduces the complexity associated with out of view computations.

Figure 3A:
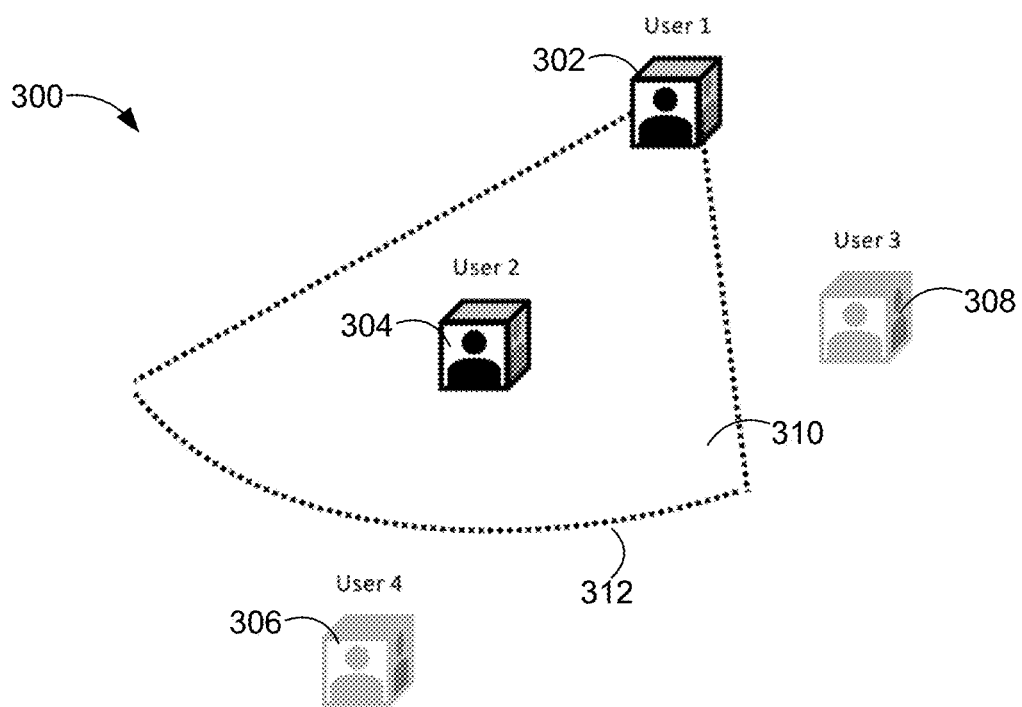
FIG. 3A shows an environment illustrating an example video stream management technique in accordance with some embodiments of the present inventive concept.

FIG. 3A shows an environment 300 illustrating an example video stream management technique. The environment 300 includes four avatars 302, 304, 306, and 308. FIG. 3A also illustrates a field-of-view region 310 corresponding to the avatar's 302 field-of-view. In this example, the telepresence management system 110 manages the audio and/or video streams presented to the user (corresponding to avatar 302). Although the avatars 304, 306, and 308 are each present in the environment 300, only avatar 304 is within the field-of-view region 310 and within a distance threshold 312

(e.g., 10, 15, 30, or 50 meters). As such, in this example, the telepresence management system 110 can provide, to avatar 302, an improved video quality of avatar 304 and/or a degraded video quality of avatars 306 and/or 308. In addition or alternatively, in some embodiments, the telepresence management system 110 can determine to provide no video of avatars 306 and/or 308. The telepresence management system 110 can continue to monitor avatars over time and can dynamically change which video streams, if any, are provided to avatar 302. Similar techniques can be used to provide video streams to avatars 304, 306 and/or 308, such that each avatar can receive a custom video stream. By reducing and/or limiting the quality of video provided to users, the telepresence management system 110 advantageously reduces the audio/video Selective Forwarding Units (SFUs) load.

Distance-Based Quality-of-Service

In conventional video conferencing solutions, interactions are often "flat" in the sense that all users interact as if they are all close to each other. Such interactions may lack the feel of real-world interactions. To address these or other concerns, the telepresence management system 110 can allow users to move throughout the virtual world, creating various conversation clusters. The term "conversation cluster" is used broadly to refer to any group of users (e.g., avatars) that satisfy conversation criteria. For example, the conversation criteria may include a distance threshold (e.g., users that are within a distance threshold of each other), may require users to be facing each other, etc. In some embodiments, avatars may only interact with (e.g., talk to, see) users that are part of the same conversation cluster.

In some embodiments, whether and/or to what degree the conversation criteria are satisfied can affect audio and/or video characteristics, such as sound volume, video quality, or dimensions. For example, in some embodiments, much like the real world, users in the telepresence session can form groups of interaction, where some are closer than others. In some embodiments, a user's sound volume, the video quality, and dimensions can reflect their relative distances.

Figure 3B:
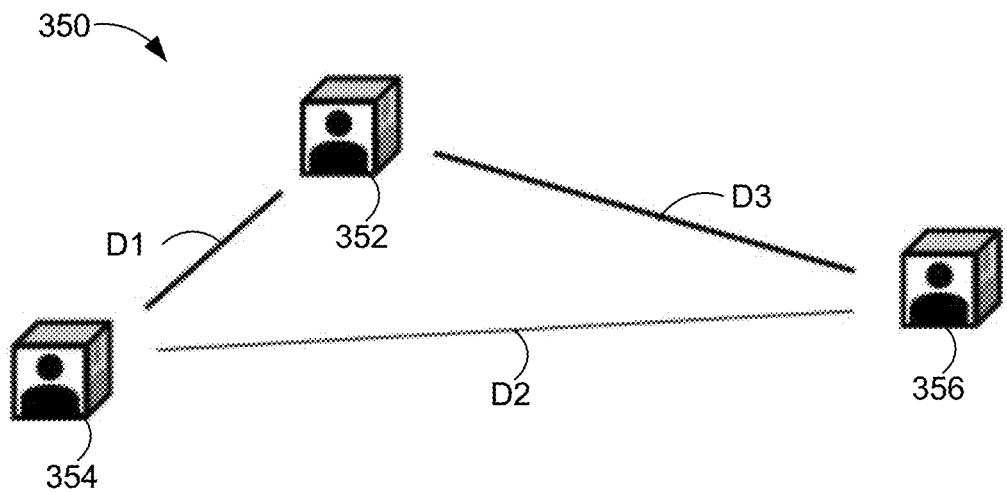
FIG. 3B shows an environment illustrating an example audio and/or video stream management technique in accordance with some embodiments of the present inventive concept.

FIG. 3B shows an environment 350 illustrating an example audio and/or video stream management techniques. The environment 300 includes a first avatar 352, a second avatar 354, and a third avatar 356. As shown, the first avatar 352 and the second avatar 354 are a distance D1 from each other; the second avatar 354 and the third avatar 356 are a distance D2 from each other, and the first avatar 352 and the third avatar 356 are a distance D3 from each other, where D1<D3<D2.

As shown, the first avatar 352 is close to the second avatar 354, so the video/audio quality between the two can be relatively high. The third avatar 356, however, is relatively distant from the first avatar 352, so the audio/video quality between the first avatar 352 and the first avatar 352 can be relatively low, as they will be occupying a small portion of each other's field of view and/or are not as close to each other. By reducing and/or limiting the quality of video provided to users, the telepresence management system 110 advantageously reduces the audio/video Selective Forwarding Units (SFUs) load.

Video and/or Audio Management

As described herein, audio and/or video characteristics can be dynamically modified based on spatial relationships between the avatars of a telepresence session. Similarly, video characteristics can be dynamically modified based on spatial relationships and/or based on frustum culling at each user. In addition or alternatively, video and/or audio streams may be restricted to users that are within a distance threshold. In this way, users who are far away and/or out of sight are not streaming their video to each other, thus not connecting in the same session graph.

Figure 4:
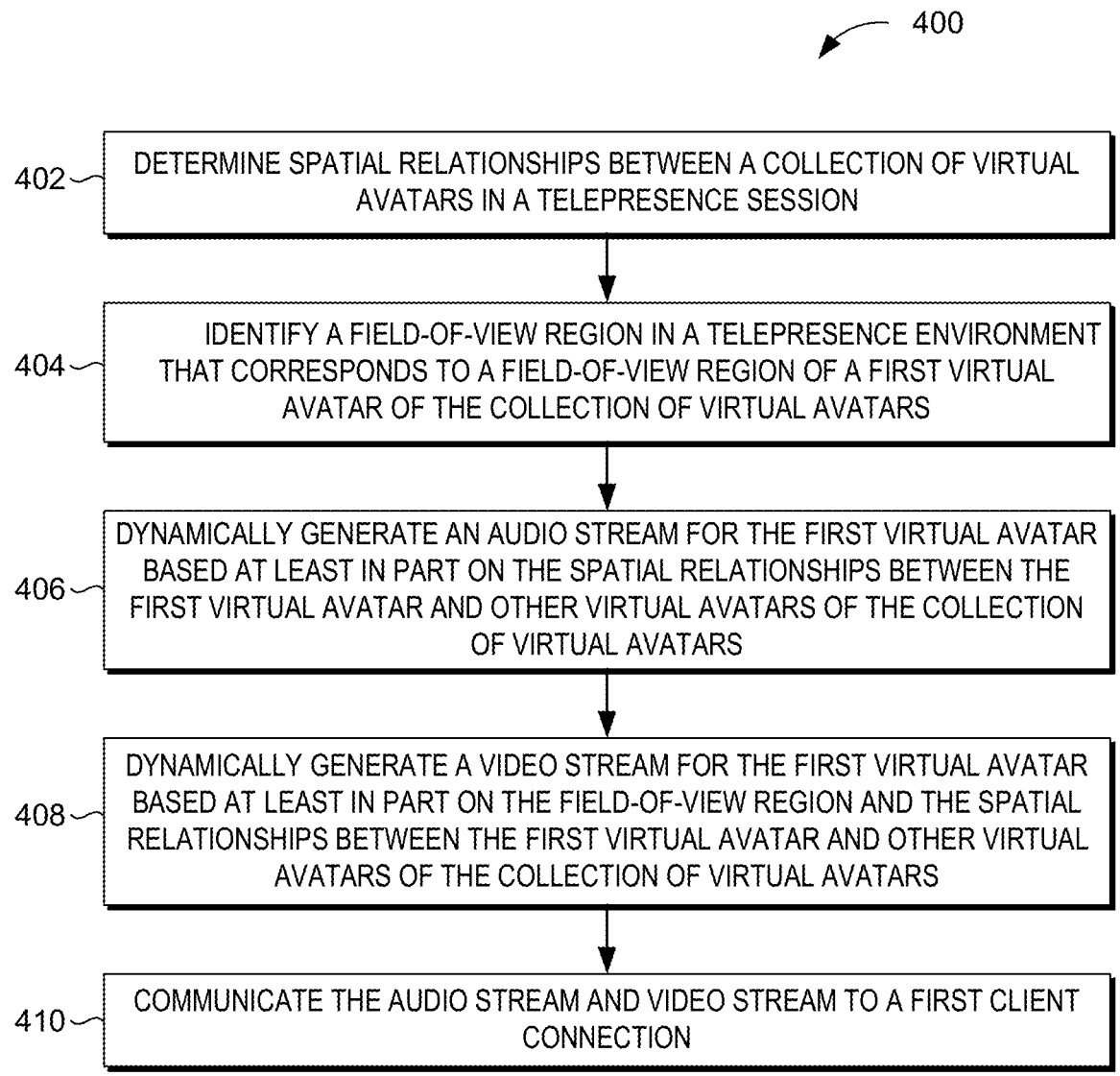
FIG. 4 is a flow diagram illustrative of some embodiments of a routine implemented by a telepresence management system for managing audio and/or video streams in a telepresence session in accordance with some embodiments of the present inventive concept.

FIG. 4 is a flow diagram illustrative of an embodiment of a routine 400 implemented by a QoS manager 120 for managing audio and/or video streams in a telepresence session. Although described as being implemented by the QoS manager 120, it will be understood that the elements outlined for routine 400 can be implemented by any one or a combination of computing devices/components that are associated with the environment 100, such as the telepresence management system 110. Thus, the following illustrative embodiment should not be construed as limiting.

At block 402, the QoS manager 120 determines one or more spatial relationships between at least some avatars of a collection of avatars in a telepresence session. As described herein, in some embodiments, the telepresence session is an immersive XR 3D environment allowing real-time audiovisual interactions between two or more avatars of the collection of avatars.

In some embodiments, the QoS manager 120 determines the one or more spatial relationships using spatial state data. For example, the QoS manager 120 can receive spatial state data corresponding to each avatar in a telepresence session. The spatial state data can include real-time position and/or orientation data corresponding to the avatar. In some embodiments, the spatial state data can include data relative to a coordinate system, such as some global coordinate system associated with the telepresence session. In some embodiments, the spatial state data can include data relative to other avatars. For example, the spatial state data can include information relating to absolute or relative distances between any two avatars. In some embodiments, determining the spatial relationships includes determining a distance between the first avatar and at least one other avatar of the collection of avatars. As described herein, in some embodiments, an avatar can be a virtual human avatar corresponding to a user wearing an XR head-mounted display.

In some embodiments, the spatial relationships indicate a distance between two or more avatars. In some embodiments, the spatial relationships indicate a relative orientation of two or more avatars. For example, the determination of the spatial relationships can include a determination of which users face each other, which users are within a line of view of a particular user, etc.

At block 404, the QoS manager 120 identifies a field-of-view region in the telepresence environment that corresponds to a field-of-view region of a first avatar of the collection of avatars. The field-of-view region can correspond to a portion of the virtual world that is observed (e.g., from the perspective of the eyes or head) by the avatar at a given time. The size of the field-of-view region may vary across embodiments. In certain implementations, the field-of-view region may be larger than, equal to, or smaller than a natural field-of-view of a user's eyes. In some embodiments, the field-of-view region is distance limited. For example, the field-of-view region may not include an area that is greater than a threshold distance (e.g., 5, 20, 40, 60 meters) away from the user. In this way, area that might otherwise be part of the field-of-view region is cut from the field-of-view region. With respect to a head-mounted display, the field-of-view region may correspond to the solid angle that is perceivable by the user when looking through the display.

At block 406, the QoS manager 120 dynamically generates an audio stream for the first avatar based at least in part on the spatial relationships between the first avatar and other avatars of the collection of avatars. To dynamically generate the audio stream, the QoS manager 120 can generate, alter, and/or combine various audio signals associated with one or more of the other avatars. In some embodiments, dynamically generate the audio stream includes varying audio volumes associated with the other avatars based on the spatial relationships between the first avatar and the other avatars. For example, the QoS manager 120 can associate a relatively louder audio volume with avatars that are relatively closer to the first avatar and/or can associate a relatively softer audio volume with avatars that are relatively further from the first avatar. In some embodiments, the levels of volume provided to the first avatar are dynamically determined for each other avatar based on the distance of those avatars from the first avatar. For example, the level of volume can be tied to a sliding scale, where the volume is softer the further away an avatar is from the first avatar. In this way, the generating audio stream more closely mimics real life conversations, where closer users are heard over users that are further away. For example, the QoS manager 120 can associate a softer audio volume with a second avatar than a third avatar based at least in part on a determination that the first avatar is further from the second avatar than the third avatar.

At block 408, the QoS manager 120 dynamically generates a video stream for the first avatar based at least in part on the field-of-view region and the spatial relationships between the first avatar and other avatars of the collection of avatars. Dynamically generating the video stream can include varying video qualities associated with other avatars based on the spatial relationships between the first avatar and the other avatars. For example, the QoS manager 120 can associate a higher resolution video with avatars that are closer to the first avatar, and lower resolutions (or sometimes no video) with avatars that are further from the first avatar. For example, the QoS manager 120 can associate a lower resolution video with a second avatar than a third avatar based at least in part on a determination that the first avatar is closer to the second avatar than the third avatar. Dynamically generating the video stream can include independently varying a video quality associated with a particular avatar based on a distance between the first avatar and the particular avatar. The video quality can include, but is not limited to, at least in one of a bitrate or a resolution.

Furthermore, in some embodiments, dynamically generating the video stream includes performing frustum culling. For example, the QoS manager 120 can discard, ignore, or otherwise not communicate video data associated with the 3D telepresence environment that is not part of the first avatar's field-of-view region. In this way, the first avatar may not receive video of avatars outside of its field-of-view, which advantageously saves on bandwidth.

At block 410, the QoS manager 120 communicates the audio stream and video stream to a first client connection associated with the first avatar. In some embodiments, the telepresence session can be running on a wearable telepresence device worn by a user. In some such embodiments, the wearable telepresence device (e.g., a head-mounted display) can include an audio device and/or a display. The audio device can produce audio associated with the audio stream. In some embodiments, the audio device can be configured to implement localized sound projection to coordinate the sounds of speakers to simulate the placement of sounds (e.g., directionality of user) in a 3D space. The display can display a video image associated with the video stream.

Fewer, more, or different blocks can be used as part of the routine 400. Furthermore, one or more blocks of the routine 400 can be omitted, performed concurrently or in a different order and/or performed by a different component of the environment 100. In some embodiments, the blocks of routine 400 can be combined with any one or any combination of blocks described herein with reference to FIG. 9. For example, in some embodiments, the QoS manager 120 determining at least one conversation cluster based at least in part on the spatial relationships. As described herein, conversation clusters include groups of avatars connections part of the same conversation. In some embodiments, conversation clusters can be based on distances between avatars. As an example, in some embodiments, any avatars within ten meters can be grouped into the same conversation clusters, where avatars can be part of more than one conversation cluster. In some embodiments, avatars that are not part of the same conversation cluster do not receive audio and/or video or received reduced or degraded audio and/or video, of each other. In some embodiments, avatars that are not part of the same conversation cluster are not enabled to interact with each other.

Although described as generating audio and for video signal by the telepresence system, in some embodiments, the audio and video signals may be sent directly or indirectly from the other users to a particular user. Accordingly, the particular user may receive a plurality of audio and/or video streams from other users and/or from the telepresence management system 110.

Distance Based Connectivity Graph

A server often has a limited capacity in terms of how many users it can service concurrently, for example based on network and/or computational resources. In standard video conferencing applications, resource allocation can be relatively straightforward since users tend to enter and leave a single conversation medium where each downstream link feed is sized uniformly. In contrast, XR telepresence applications, resource allocation can be complicated because groups of users can have conversations that slowly bleed into or out of conversations with other groups. In this way, XR telepresence applications enable dynamically changing conversation clusters.

In general, it can be desirable to assign all users of a particular conversation cluster to the same server or set of servers. This can minimize the impact of connection disruptions and handover as people move from one area to another. However, with large enough virtual worlds, there may be a need to allocate different conversation clusters across multiple servers. Disclosed herein are techniques for allocating groups of users to servers based on a distance-based connectivity graph. An allocation task can be formulated as a minimal k-cut balanced graph partitioning problem with the goal of minimizing the total cut edges not covered by a subgraph.

Figure 5:
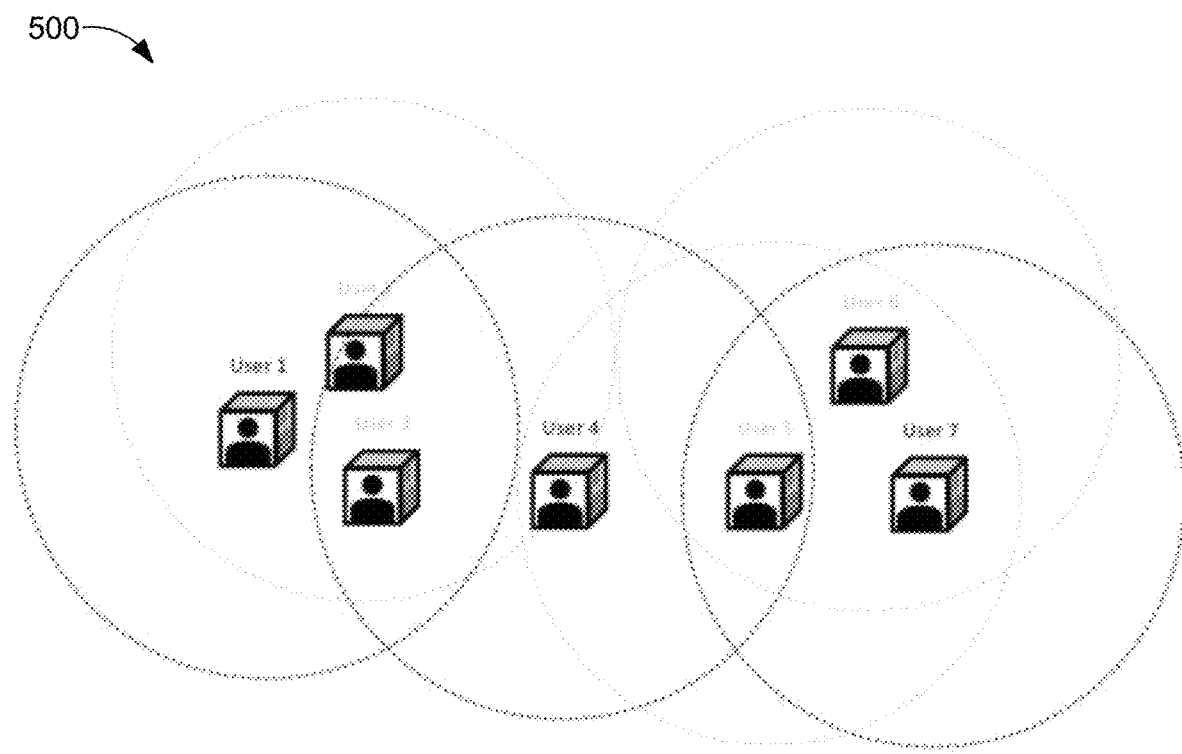
FIG. 5 illustrates example telepresence session graph constructed based on distance between users in accordance with some embodiments of the present inventive concept.

FIG. 5 illustrates example telepresence session graph 500 constructed based on distance between users. The graph 500 show shows seven users: User 1-7. As shown, each user has a radius maximum radius that defines their connectivity within the 3D environment. In general, conversation between closer users can be more important than with distant users. Accordingly, graph edges can be undirected and weighted based on distance.

A telepresence session has U users in total with S servers available to host audio/video streaming sessions. Each server is capable of handling M client connections. In some cases, conversations between any two users are only successful if the edge connecting the two nodes exists on the same server. In some such embodiments, for two users to communicate, they need to be connected to at least one shared server. In some embodiments, N denotes how many servers a user can associate with. In practice, Nis typically less than 3 as the overhead for clients to manage multiple server connections is often quite high. A user might want to connect to multiple servers in cases when they leave one conversation group and enter another. In these embodiments, a user can set up two sessions in parallel to avoid a loss in connection during a handover. This also means they can be in multiple conversation groups (e.g., conversation clusters) concurrently that could be hosted on independent servers.

Resource Allocation

In a 3D telepresence session, the spatial nature of the environment can allow for optimizations which can introduce additional constraints on the resource allocator 130. For example, subgraphs naturally tend to capture the spatial relationship between groups of users. For this reason, it is more likely that a subgraph would need to merge with another nearby subgraph as compared to one that is far away in terms of virtual distance. To reduce the number of connections that need to be migrated during these join/merge operations, nearby subgraphs and users can be allocated to the same server, in anticipation of join/merge operations.

Figure 6A:
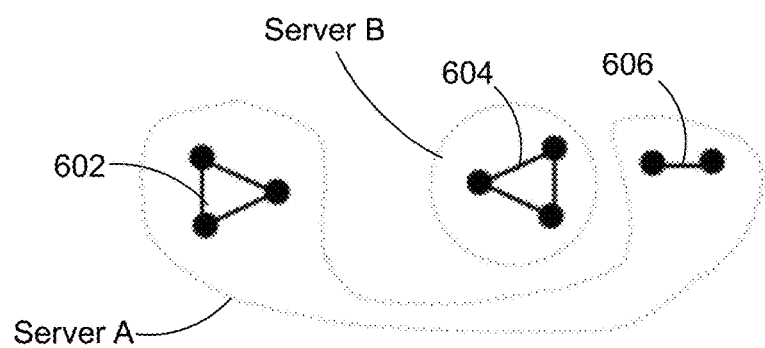
FIGS. 6A and 6B illustrate example server allocation techniques in accordance with some embodiments of the present inventive concept.
Figure 6B:
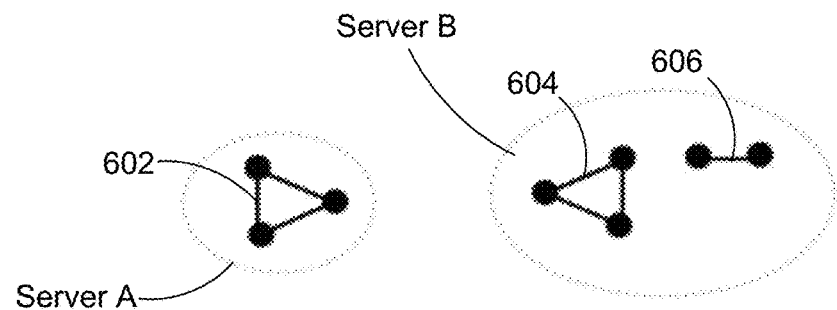

FIGS. 6A and 6B illustrate example server allocation techniques. As shown, each of the figures show three different conversation clusters (sometimes referred to as subgraphs): clusters 602, 604, and 606. The dotted lines depict that the subgraphs are allocated to the same server. As shown in FIG. 6A, clusters 602 and 606 are allocated to Server A, while cluster 604 is allocated to Server B. Since clusters 602 and 606 are not close to each other, relative to cluster 604, this allocation is not based on the environment's spatial properties. In some embodiments, such as allocation will lead to more connection migrations, in the likely event that the subgraphs 604, 606 merge. In contrast, in FIG. 6A, cluster 602 is allocated to Server A, and clusters 604 and 606 are allocated to Server B. This allocation is based on the environment's spatial properties. In some embodiments, such as allocation will lead to fewer connection migrations, in the event that the subgraphs 604, 606 merge.

When the resource allocator 130 has the freedom to map users into several subgraphs (e.g., users can maintain more than one connection, N>1), allocation can be biased based on the network quality of various nodes. For example, in some embodiments, it can be better to request multiple connections from clients that have larger bandwidth network connections. The resource allocator 130 can collect and use quality metrics to prioritize which users could participate in multiple sessions. For example, the resource allocator 130 can prefer the user with better link quality metrics to function as a bridge between the two subgraphs, instead of putting that burden on the node with lower link quality.

In some embodiments, a single server can host all sessions. In some such embodiments, all users can be assigned to a single server. In addition or alternatively, in some such embodiments, the resource allocator 130 might distribute subgraphs across multiple servers, for example to balance load and/or more easily accommodate new users.

In some embodiments, the number of clients U exceeds the maximum capacity of a single server S. As a result, the system needs to load balance clients across multiple servers. As described herein, in some embodiments, users can only communicate if the nodes and the edge between them is allocated to the same server. This resource management problem can be modeled as a minimal k-cut graph partitioning problem, where the cost metric balances the number of nodes on each server while minimizing any cut edges not covered by any subgraph (e.g., users that are near each other but cannot communicate).

Figure 7:
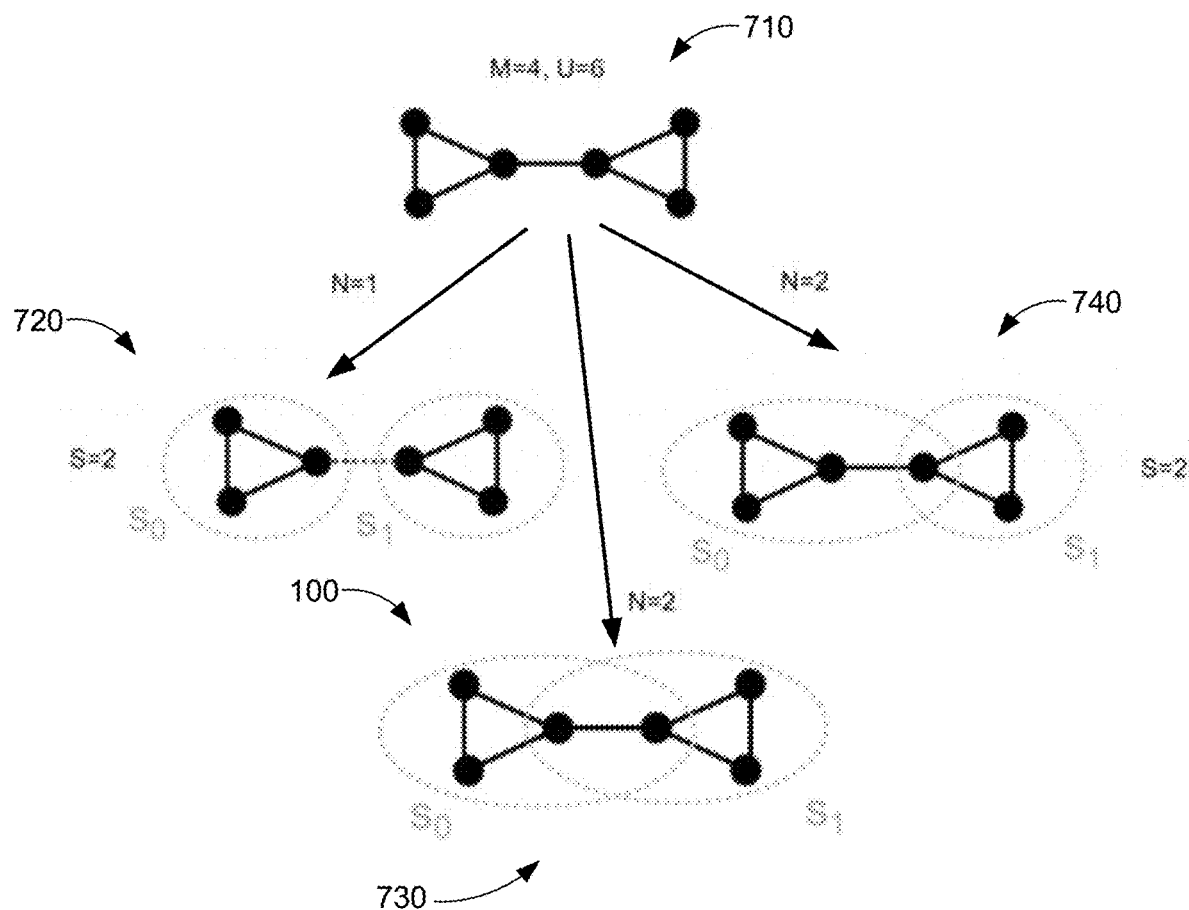
FIG. 7 illustrates example server allocation techniques in accordance with some embodiments of the present inventive concept.

FIG. 7 illustrates three example server allocation techniques. FIG. 7 shows a group 710 of six total users (i.e., U=4) that need to be allocated on two servers that each support up to four users each (i.e., M=4). Several different allocations are possible, for example depending on the total number of connections a single client can make. Consider a first scenario in which each client can associate with only one server (i.e., N=1). In this first scenario, the 6-user graph can be partitioned into two disjoint subgraphs, each with three users, as shown in subgraph 720. This will result in a single user from each of the subgraphs that are not able to communicate with the other, despite being within range. Consider a second scenario in which each client can associate with two servers (i.e., N=2). In this second scenario, the 6-user graph can be partitioned into two connected subgraphs, one with four users and another with three users, where one of the users is in both subgraphs. This is illustrated by subgraph 740. Alternatively, in this second scenario, the 6-user graph can be partitioned into two connected subgraphs, both with four users, where two of the users are in both subgraphs. This is illustrated by subgraph 740. In both subgraphs 730 and 740, the users' perceived connectivity breakage is reduced, at the cost of complexity to manage multiple server connections.

In some embodiments, it can be advantageous to reduce the number of clients that are part of multiple subgraphs. Users associated with more than one server introduce complexity in join/teardown and require additional overhead to maintain multiple client sessions. To address these or other concerns, the resource allocator 130 can prefer allocations that result in fewer users with multiple associations. As such, subgraph 740 can be preferred to subgraph 730, since only one user has multiple associations.

The resource allocator 130 can use one or more heuristics (including heuristics to predetermine the number of subgraphs) to simplify the problem and approximate an optimal solution. Some of these heuristics include, but are not limited to, linear programming formulations, Karger's algorithm, Karger-steiner algorithms and Spectral Clustering techniques.

In embodiments where there is no feasible mapping of users to servers that covers all edges or there simply is not enough server capacity for all users (M*S<U), some user connections will be dropped. For example, consider a scenario in which the total server capacity from two servers is six users and there are seven users trying to connect and form a single graph. The minimal k-cut graph partitioning heuristic would naturally tend to select strong (e.g., higher weight/more closely connected) subgraphs and be biased towards dropping the more distant links nodes with the weakest edges.

Alternative approaches to scaling video conferencing sessions include decreasing overall QoS through coding and compression or sharing multiplexed streams between servers in the back end. These approaches are less applicable in VR environments where multiple audio/video channels cannot easily be mixed on the server since each user adjusts volumes differently based on their distance with other speakers. In practice, each server can support full duplex (everyone speaking) group sizes of over 50, 100, 200, or 1000 users.

Dynamic Allocation of Resources

Occasionally it is necessary to move a subgraph or cluster of users from one server to another. This could happen if a server is reaching capacity and new users are joining or simply as a load balancing operation. In addition or alternatively, a user or cluster of users may be moved based on network utilization, or as part of a dynamic network routing policy.

Figure 8A:
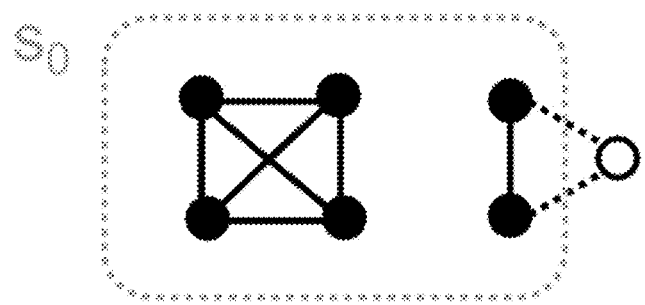
FIGS. 8A-8C illustrate an example method for allocating servers to client connections in accordance with some embodiments of the present inventive concept.
Figure 8B:
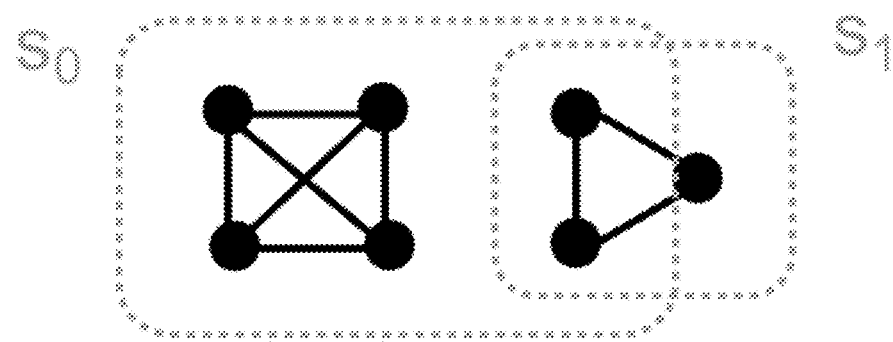
Figure 8C:
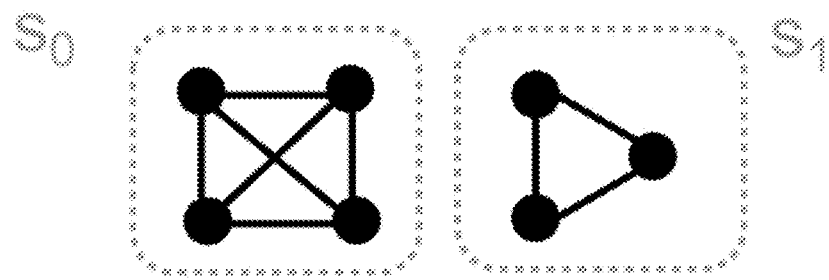

FIGS. 8A-8C illustrate an example method for allocating servers to client connections. As shown, the method includes two-step process that allows a subgraph of users to migrate from one server to another without disruption. The process relies on the ability for clients to multiplex a small number of server connections. In the example, a new user is attempting to join the system, but the existing server $S_0$ does not have any additional capacity. The system starts up a new server $S_1$ with the new node and the members of the session that are currently running on the original server. During this period of time, the nodes that are part of the session about to migrate operate on both servers concurrently. Once the new session has been successfully established on the new server, the clients can be removed from the original server.

Figure 9:
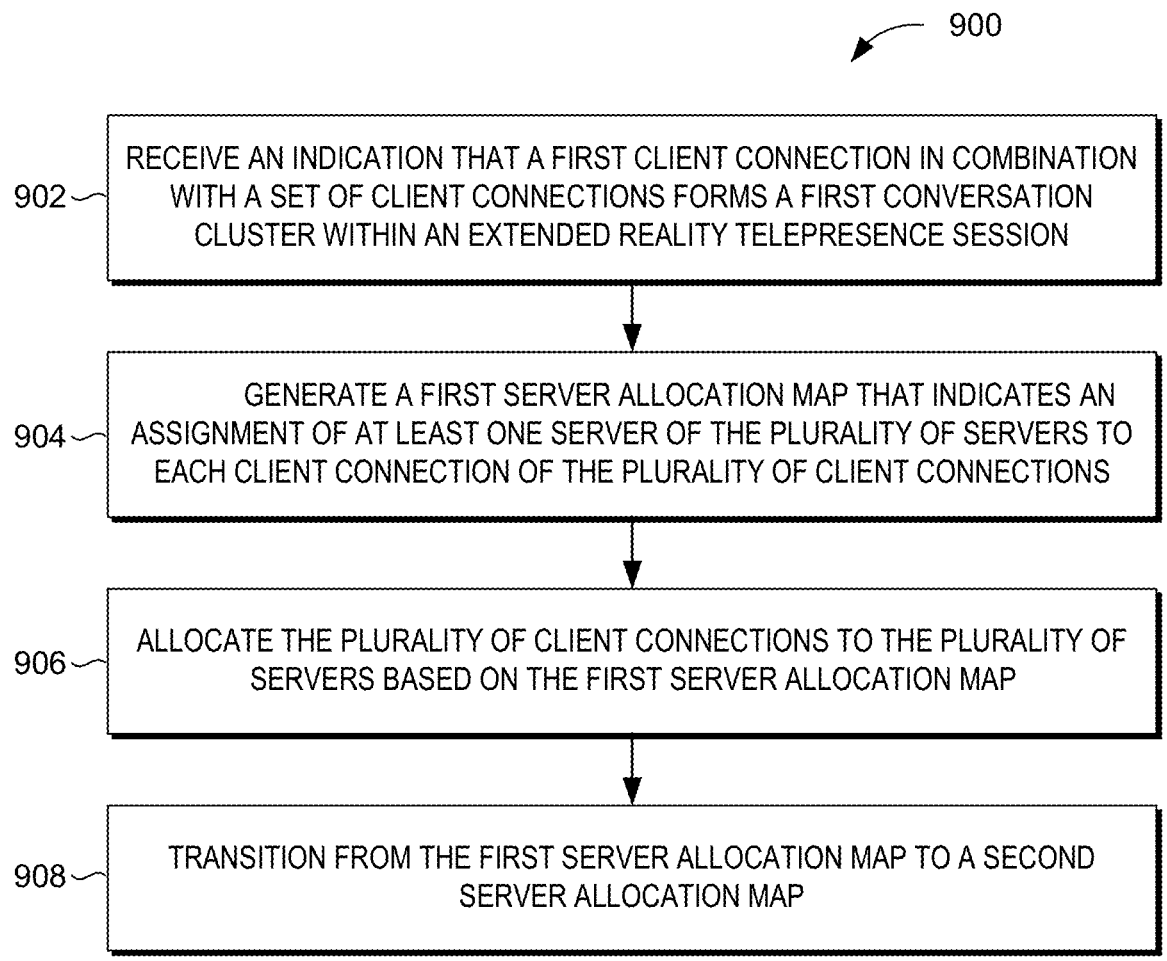
FIG. 9 is a flow diagram illustrative of some embodiments of a routine implemented by a telepresence management system for allocating resources for a telepresence session in accordance with some embodiments of the present inventive concept.

FIG. 9 is a flow diagram illustrative of some embodiments of a routine implemented by a telepresence management system 110 for allocating resources for a telepresence session. Although described as being implemented by the telepresence management system 110, it will be understood that the elements outlined for routine 900 can be implemented by one or more computing devices/components that are associated with the environment 100. Thus, the following illustrative embodiment should not be construed as limiting.

At block 902, the telepresence management system 110 receives an indication that a first client connection in combination with a set of client connections forms a first conversation cluster within an XR telepresence session. As described herein, the XR telepresence session comprises a plurality of client connections hosted by a plurality of servers. A conversation cluster can include a group of client connections (e.g., avatars) that satisfy conversation criteria (e.g., within a distance threshold of each other). In some embodiments, the indication can correspond to the first client connection being activated in the telepresence session. In some embodiments, the indication can correspond to a request to activate the first client connection. For example, the indication can correspond to a user activating the client application 104 on a user computing system to create the first client connection. In some embodiments, the indication can correspond to the first client connection transitioning from a second conversation cluster to the first conversation cluster. For example, the indication can be received as a result of an avatar associated with the first client connection moving closer to the set of client connections so as to satisfy conversation criteria sufficient to forms the first conversation cluster.

The set of client connections (also referred to herein as legacy client connections) can correspond to the client connections that are activate in the telepresence session and associated with other avatars in the telepresence session at the moment prior to when the first client connection forms part of the first conversation cluster. Thus, in some embodiments, the first conversation cluster can correspond to all the client connections of the telepresence session that are active. Alternatively, in some embodiments, the first conversation cluster can correspond to a subset of the available client connections of the telepresence session.

In some embodiments, the telepresence management system 110 can receive or maintain status identifiers of the client connections. For example, the telepresence management system 110 may receive updates regarding availability or unavailability via status update communications or "heartbeats" from the client connections. In some embodiments, the indication that the first client connection, in combination with the set of client connections, forms a first conversation cluster can correspond to a status update communication from the first client connection. For example, the indication can include a status update that the first client connection is available or requesting access to the telepresence session.

Prior to the telepresence management system 110 receiving the indication, and at least for a first time period, the telepresence management system 110 manages the server resources of the telepresence session according to a legacy server allocation map (server allocation map used prior to the addition of the client connection. A server allocation map can indicate assignments of servers (or other resources) to client connections. For example, a server-client assignment of a first server to a first client connection can indicate that the first server is assigned to host the first client connection. In embodiments in which the first client connection was unavailable (e.g., the user was not active in the telepresence session) during the first time period, the legacy processing node map may not include any assignments to the first client connection. In embodiments in which the first client connection was part of another conversation cluster or was available and part of no conversation clusters, the legacy processing node map may include an assignment of a server to the first client connection; however, the legacy server assignment may or may not have been a correct assignment based on the first client connection now being part of the first conversation cluster.

At block 904, the telepresence management system 110 generates a first server allocation map. In some embodiments, the first server allocation map can be an interim server allocation map, as described herein. In some embodiments, to generate the first server allocation map, the telepresence management system 110 generates a tentative processing node assignment according to a map generation policy and then modifies the assignments related to the server allocation map to generate the first server allocation map. For example, the tentative processing node assignment can identify the first client connection as being assigned to a first server. Furthermore, the first server allocation map can assign some or all of the legacy client connections to the first server as well.

As described herein, it can be desirable to assign all client connections of the same conversation cluster to the same server. However, consider a scenario in which, at the moment prior to when the first client connection forms part of the first conversation cluster, the legacy client connections are assigned to a second server that is already at capacity or is otherwise unavailable to host an additional client connection. In some such embodiments, the first client connection cannot be assigned to the second server, at least not without reassigning one or more other servers that were assigned to the second server via the legacy server allocation map. To address these challenges, the first server allocation map can include multiple server assignments for one or more of the legacy client connections. For example, the legacy client connections can set up two sessions with different servers in parallel to avoid a loss in connection during a handover. Continuing with the example above, the tentative processing node assignment can identify the first client connection as being assigned to a first server, the legacy client connections as being assigned to a first server, and the legacy client connections as being assigned to the second (legacy) server.

In some embodiments, the telepresence management system 110 spins up the first server prior to and/or currently with generating the first server allocation map. In some embodiments, the first server is already part of the telepresence management system at the time of the indication.

In some embodiments, the first server allocation map can indicate an assignment of at least one server to each of the client connections of the first conversation cluster. Furthermore, the first server allocation map can indicate an assignment of fewer servers of the plurality of servers to the first client connection than servers of the plurality of servers to other client connections of the first conversation cluster. For example, the first server allocation map can include one server assignments for the first client connection and two server assignments for the legacy client connections.

At block 906, the telepresence management system 110 allocates the plurality of client connections to the plurality of servers based on the first server allocation map. Continuing with the above example, the telepresence management system 110 allocates each of the client connections of the first conversation cluster to the first server and allocates each of the legacy client connections to the second server.

The telepresence management system 110 can use the first server allocation map for a second time period that follows the first time period. In some embodiments, the first time period may overlap with the second time period. In certain embodiments, the telepresence management system 110 can transition from the legacy server allocation map to the first server allocation map according to a map transition policy. The map transition policy can indicate the transition time, etc. to transition from the legacy server allocation map to the first server allocation map.

As part of allocates the plurality of client connections to the plurality of servers, the telepresence management system 110 can cause the plurality of servers to host the plurality of client connections according to the first server allocation map.

At block 908, the telepresence management system 110 transitions from the first server allocation map to a second server allocation map based on a map transition policy. The second server allocation map be generated in a manner similar to that described herein with reference to block 906. The second server allocation map can indicate an assignment of the same server(s) of the plurality of servers to the first client connection and the second server allocation map. In some embodiments, the second server allocation map drops at least one of the assignments for the legacy client connections. For example, continuing with the above scenario, the second server allocation map can remove the assignment of the second sever to the legacy client connections. In this way, the server allocation map can assign each of the client connections of the first conversation cluster to the first server, and none of those client connections need another server connection. In some embodiments, one or more of the client connections of the first conversation cluster may be assigned one or more other servers. In some embodiments, the telepresence management system 110 transitions from the first server allocation map to the second server allocation map based on a map transition policy.

Fewer, more, or different blocks can be used as part of the routine 900. In some embodiments, one or more blocks can be omitted. In some embodiments, the blocks of routine 900 can be combined with any one or any combination of blocks described herein with reference to at least FIG. 4. For example, audio and/or video characteristics can be dynamically modified based at least in part on spatial relationships between client connections (e.g., avatars), video quality can be based on distance with a maximum range, and/or video quality can be subject to frustum culling at each client. In this way, users who are far away may not stream their video to each other, thus not connecting in the same session graph. Similar server-client reassignments can occur according to a processing node map generation policy (e.g., to achieve load balancing or an approximately equal distribution of groups of data, etc.).

System Architecture

In an XR telepresence environment, there may be a set of tradeoffs associated with where in the architecture you perform channel selection and bit rate selection. In some embodiments, each client can request an active audio stream from any connected neighbors within its subgraph and then locally mix their audio and video on the client side. This approach may be referred to as a "client-centric approach." A client-centric approach may involve relatively more downlink bandwidth but may distribute the computational workload of spatial audio and video rendering onto the clients. In some embodiments, the system could send some or all of the location data to a server that could mix the audio correctly and potentially even prerender down sample video frames. This approach may be referred to as a "server-centric approach." A server-centric approach may entail additional computation on the server side (as compared to a client-centric approach) but may reduce the downstream network traffic. Furthermore, a server-centric approach may come at the cost of latency. For example, if a user is rotating the server-centric approach will suffer almost twice the latency in how it applies spatial audio queues. In some embodiments, a hybrid approach (sometimes referred to as a dynamic approach) can be used. A hybrid approach can adapt to different network characteristics.

EXAMPLE EMBODIMENTS

Embodiments of the present disclosure can be described in view of the following clauses:

Clause 1. A method of dynamically managing audio and/or video streams in a telepresence session, the method comprising:

determining spatial relationships between at least some virtual avatars of a collection of virtual avatars in a telepresence session, wherein the telepresence session is an immersive extended reality 3D environment allowing real-time audiovisual interactions between two or more virtual avatars of the collection of virtual avatars;

identifying a field-of-view region in the telepresence environment that corresponds to a field-of-view region of a first virtual avatar of the collection of virtual avatars;

dynamically generating an audio stream for the first virtual avatar based at least in part on the spatial relationships between the first virtual avatar and other virtual avatars of the collection of virtual avatars;

dynamically generating a video stream for the first virtual avatar based at least in part on the field-of-view region and the spatial relationships between the first virtual avatar and other virtual avatars of the collection of virtual avatars; and communicating the audio stream and video stream to a first client connection, wherein the first client connection is associated with the first virtual avatar, wherein an audio device produces audio associated with the audio stream, and wherein a display device displays a video image associated with the video stream.

Clause 2. The method of any of the previous clauses, wherein said dynamically generating the audio stream comprises varying audio volumes associated with the other virtual avatars based on the spatial relationships between the first virtual avatar and the other virtual avatars.

Clause 3. The method of any of the previous clauses, wherein said dynamically generating the audio stream comprises associating a louder audio volume with a second virtual avatar than a third virtual avatar based at least in part on a determination that the first virtual avatar is closer to the second virtual avatar than the third virtual avatar.

Clause 4. The method of any of the previous clauses, wherein said dynamically generating the audio stream comprises associating a softer audio volume with a second virtual avatar than a third virtual avatar based at least in part on a determination that the first virtual avatar is further from the second virtual avatar than the third virtual avatar.

Clause 5. The method of any of the previous clauses, wherein said dynamically generating the audio stream comprises independently varying an audio volume associated with other virtual avatars based on a distance between the first virtual avatar and a particular virtual avatar.

Clause 6. The method of any of the previous clauses, wherein said dynamically generating the video stream comprises varying video qualities associated with other virtual avatars based on the spatial relationships between the first virtual avatar and the other virtual avatars.

Clause 7. The method of any of the previous clauses, wherein said dynamically generating the video stream comprises associating a higher resolution video with a second virtual avatar than a third virtual avatar based at least in part on a determination that the first virtual avatar is closer to the second virtual avatar than the third virtual avatar.

Clause 8. The method of any of the previous clauses, wherein said dynamically generating the video stream comprises associating a lower resolution video with a second virtual avatar than a third virtual avatar based at least in part on a determination that the first virtual avatar is closer to the second virtual avatar than the third virtual avatar.

Clause 9. The method of any of the previous clauses, wherein said dynamically generating the video stream comprises independently varying a video quality associated with a particular virtual avatar based on a distance between the first virtual avatar and the particular virtual avatar.

Clause 10. The method of any of the previous clauses 0, wherein varying the video quality comprises varying at least in one of a bitrate or a resolution.

Clause 11. The method of any of the previous clauses, wherein said dynamically generating the video stream comprises at least one of discarding or ignoring video data associated with the 3D telepresence environment that is not part of the field-of-view region.

Clause 12. The method of any of the previous clauses, wherein the video stream only includes portions of the field-of-view region, wherein a video quality of a particular virtual avatar in the field-of-view region improves as a distance between the first virtual avatar and the particular virtual avatar decreases.

Clause 13. The method of any of the previous clauses 3, wherein the audio stream includes audio corresponds to portions outside of the field-of-view region, wherein a particular audio volume associated with a particular virtual avatar of the plurality of other virtual avatars increases as a distance between the first virtual avatar and the particular virtual avatar decreases.

Clause 14. The method of any of the previous clauses, wherein said determining the spatial relationships comprises determining a distance, in immersive extended reality 3D environment, between the first virtual avatar and at least one other virtual avatar of the collection of virtual avatars.

Clause 15. The method of any of the previous clauses, further comprising determining at least one conversation cluster based at least in part on the spatial relationships, wherein each conversation cluster of the at least one conversation cluster comprises a group of virtual avatars including the first virtual avatar, wherein virtual avatars associated with client connections part of the same conversation cluster are enabled to interact with each other.

Clause 16. The method of any of the previous clauses 5, wherein virtual avatars that are not associated with client connections part of the same conversation cluster are not enabled to interact with each other.

Clause 17. The method of any of the previous clauses, wherein the first virtual avatar is a virtual human avatar corresponding to a user wearing an extended reality head-mounted display.

Clause 18. The method of any of the previous clauses, further comprising:
receiving at least one of head pose or body pose data of the user;
wherein said identifying the field-of-view region is based at least in part on the at least one of head pose or body pose data.

Clause 19. A computing system of a telepresence management system, the computing system comprising:
memory; and
one or more processors coupled to the memory and configured to:
determine spatial relationships between a collection of virtual avatars in a telepresence session, wherein the telepresence session is an immersive extended reality 3D environment allowing real-time audiovisual interactions between two or more virtual avatars of the collection of virtual avatars;
identify a field-of-view region in a 3D telepresence environment that corresponds to a field-of-view region of a first virtual avatar of the collection of virtual avatars;
dynamically generate an audio stream for the first virtual avatar based at least in part on the spatial relationships between the first virtual avatar and other virtual avatars of the collection of virtual avatars;
dynamically generate a video stream for the first virtual avatar based at least in part on the field-of-view region and the spatial relationships between the first virtual avatar and other virtual avatars of the collection of virtual avatars; and
communicate the audio stream and video stream to a first client connection, wherein the first client connection is associated with the first virtual avatar, wherein an audio device produces audio associated with the audio stream, and wherein a display device displays a video image associated with the video stream.

Clause 20. Non-transitory computer readable media comprising computer-executable instructions that, when executed by a computing system of a data intake and query system, cause the computing system to:
determine spatial relationships between a collection of virtual avatars in a telepresence session, wherein the telepresence session is an immersive extended reality 3D environment allowing real-time audiovisual interactions between two or more virtual avatars of the collection of virtual avatars;

identify a field-of-view region in a 3D telepresence environment that corresponds to a field-of-view region of a first virtual avatar of the collection of virtual avatars;

dynamically generate an audio stream for the first virtual avatar based at least in part on the spatial relationships between the first virtual avatar and other virtual avatars of the collection of virtual avatars;

dynamically generate a video stream for the first virtual avatar based at least in part on the field-of-view region and the spatial relationships between the first virtual avatar and other virtual avatars of the collection of virtual avatars; and communicate the audio stream and video stream to a first client connection, wherein the first client connection is associated with the first virtual avatar, wherein an audio device produces audio associated with the audio stream, and wherein a display device displays a video image associated with the video stream.

Clause 21. A method for allocating resources for an extended reality telepresence session, the method comprising:

receiving an indication that a first client connection in combination with a set of client connections forms a first conversation cluster within an extended reality telepresence session, wherein the extended reality telepresence session comprises a plurality of client connections hosted by a plurality of servers, wherein the plurality of client connections includes the first client connection and the set of client connections;

based on said receiving the indication, generating a first server allocation map, wherein the first server allocation map indicates an assignment of at least one server of the plurality of servers to each client connection of the plurality of client connections, wherein the first server allocation map indicates an assignment of more servers of the plurality of servers to other client connections of the first conversation cluster than the first client connection;

allocating the plurality of client connections to the plurality of servers based on the first server allocation map; and based on a map transition policy, transitioning from the first server allocation map to a second server allocation map, wherein based on said transitioning, the plurality of client connections are allocated to the plurality of servers based on the second server allocation map, wherein the second server allocation map indicates an assignment of fewer servers of the plurality of servers to the other client connections of the first conversation cluster than the first server allocation map.

Clause 22. The method of any of the previous clauses, further comprising determining that the first server is unavailable to support additional client connections.

Clause 23. The method of any of the previous clauses, wherein the first server allocation map further indicates an assignment of the first server to the set of client connections, and wherein the first server allocation map further indicates an assignment of a second server to the client connections of the first conversation cluster.

Clause 24. The method of clause 23, further comprising spinning up the second server such that the second server forms part of the plurality of servers.

Clause 25. The method of any of the previous clauses, wherein the extended reality telepresence session comprises a combination of one or more of virtual reality, augmented reality, or mixed reality.

Clause 26. The method of any of the previous clauses, wherein the indication comprises a request to establish the first client connection by a user of a first user computing system.

Clause 27. The method of any of the previous clauses, wherein the indication is based on a determination that the first client connection has been activated.

Clause 28. The method of any of the previous clauses, wherein the first server allocation map indicates an assignment of a first server of the plurality of servers to each client connection of the first conversation cluster.

Clause 29. The method of any of the previous clauses, wherein the first server allocation map indicates an assignment of only one server of the plurality of servers to the first client connection.

Clause 30. The method of any of the previous clauses, wherein the first server allocation map indicates an assignment of two servers of the set of client connections.

Clause 31. The method of any of the previous clauses, wherein the first server allocation map is used during a first time period and the second server allocation map is used during a second time period that follows the first time period.

Clause 32. The method of any of the previous clauses, wherein a third server allocation map indicates an assignment of a first server to client connections of a second conversation cluster and an assignment of the first server to client connections of a third conversation cluster, wherein prior to receiving the indication, the plurality of client connections are allocated to the plurality of servers based on the third server allocation map.

Clause 33. The method of clause 32, wherein the third server allocation map is used during a third time period the precedes the first time period.

Clause 34. The method of any of the previous clauses, wherein the map transition policy indicates that the first conversation cluster are to transition from the first server allocation map to the second server allocation map based on a determination that a timing threshold is satisfied.

Clause 35. The method of any of the previous clauses, wherein the extended reality telepresence session is an immersive 3-dimensional environment, wherein each of the plurality of client connections corresponds to a different virtual avatar, and wherein virtual avatars associated with client connections part of the same conversation cluster are enabled to interact with each other.

Clause 36. A computing system of a telepresence management system, the computing system comprising:
memory; and
one or more processors coupled to the memory and configured to:

receive an indication that a first client connection in combination with a set of client connections forms a first conversation cluster within an extended reality telepresence session, wherein the extended reality telepresence session comprises a plurality of client connections hosted by a plurality of servers, wherein the plurality of client connections includes the first client connection and the set of client connections;

generate a first server allocation map, wherein the first server allocation map indicates an assignment of at least one server of the plurality of servers to each client connection of the plurality of client connections, wherein the first server allocation map indicates an assignment of more servers of the plurality of servers to other client connections of the first conversation cluster than the first client connection;

allocate the plurality of client connections to the plurality of servers based on the first server allocation map; and based on a map transition policy, transition from the first server allocation map to a second server allocation map, wherein based on the transitioning, the plurality of client connections are allocated to the plurality of servers based on the second server allocation map, wherein the second server allocation map indicates an assignment of fewer servers of the plurality of servers to the other client connections of the first conversation cluster than the first server allocation map.

Clause 37. Non-transitory computer readable media comprising computer-executable instructions that, when executed by a computing system of a data intake and query system, cause the computing system to:

receive an indication that a first client connection in combination with a set of client connections forms a first conversation cluster within an extended reality telepresence session, wherein the extended reality telepresence session comprises a plurality of client connections hosted by a plurality of servers, wherein the plurality of client connections includes the first client connection and the set of client connections;

generate a first server allocation map, wherein the first server allocation map indicates an assignment of at least one server of the plurality of servers to each client connection of the plurality of client connections, wherein the first server allocation map indicates an assignment of more servers of the plurality of servers to other client connections of the first conversation cluster than the first client connection;

allocate the plurality of client connections to the plurality of servers based on the first server allocation map; and based on a map transition policy, transition from the first server allocation map to a second server allocation map, wherein based on the transitioning, the plurality of client connections is allocated to the plurality of servers based on the second server allocation map, wherein the second server allocation map indicates an assignment of fewer servers of the plurality of servers to the other client connections of the first conversation cluster than the first server allocation map.

Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that the methods/steps described herein may be performed in any sequence and/or in any combination, and the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for allocating resources for an extended reality telepresence session, the method comprising:
receiving an indication of a new client connection within an extended reality telepresence session, wherein the extended reality telepresence session comprises a plurality of client connections hosted by a plurality of servers, wherein the client connections are grouped into a plurality of conversation clusters based on virtual distances between client connections, wherein every client connection of a particular conversation cluster is hosted by a common server of the plurality of servers;
determining, based on a virtual location of the new client connection, that the new client connection should be part of a first conversation cluster of the plurality of conversation clusters, wherein the first conversation cluster and a second conversation cluster are hosted by a first server of the plurality of servers, wherein the first conversation cluster includes a first group of client connections;
based on a determination that the first server is unavailable to support additional client connections, generating a first server allocation map, wherein the first server allocation map indicates an assignment of the first group of client connections and the second conversation cluster to the first server and indicates an assignment of the first group of client connections and the new client connection to a second server;
allocating the plurality of client connections to the plurality of servers based on the first server allocation map;
generating a second server allocation map, wherein the second server allocation map indicates an assignment of the second conversation cluster to the first server and an assignment of the first group of client connections and the new client connection to the second server, wherein the second server allocation map indicates no assignments of the first group of client connections or the new client connection to the first server; and
based on a map transition policy, transitioning from the first server allocation map to the second server allocation map.

2. The method of claim 1, further comprising spinning up the second server such that the second server forms part of the plurality of servers.

3. The method of claim 1, wherein the extended reality telepresence session comprises a combination of one or more of virtual reality, augmented reality, or mixed reality.

4. The method of claim 1, wherein the indication comprises a request to establish the new client connection by a user of a first user computing system.

5. The method of claim 1, wherein the indication is based on a determination that the new client connection has been activated.

6. The method of claim 1, wherein the first server allocation map indicates an assignment of only one server of the plurality of servers to the new client connection.

7. The method of claim 1, wherein the first server allocation map is used during a first time period and the second server allocation map is used during a second time period that follows the first time period.

8. The method of claim 7, wherein a third server allocation map indicates an assignment of the first server to client connections of the second conversation cluster and an assignment of the first server to client connections of a third conversation cluster, wherein prior to receiving the indication, the plurality of client connections is allocated to the plurality of servers based on the third server allocation map.

9. The method of claim 8, wherein the third server allocation map is used during a third time period that precedes the first time period.

10. The method of claim 1, wherein the map transition policy indicates to transition from the first server allocation map to the second server allocation map based on a determination that a timing threshold is satisfied.

11. The method of claim 1, wherein the extended reality telepresence session is an immersive 3-dimensional environment, wherein each of the plurality of client connections corresponds to a different virtual avatar, and wherein virtual avatars associated with client connections part of the same conversation cluster are enabled to interact with each other.

12. The method of claim 1, wherein the second server allocation map allocates the first server to a first client connection, wherein the first server is configured to:
determine spatial relationships between at least some virtual avatars of a collection of virtual avatars in the extended reality telepresence session, wherein the extended reality telepresence session is an immersive extended reality 3D environment allowing real-time audiovisual interactions between two or more virtual avatars of the collection of virtual avatars;
identify a field-of-view region in a telepresence environment of the extended reality telepresence session that corresponds to a field-of-view region of a first virtual avatar of the collection of virtual avatars;
dynamically generates an audio stream for the first virtual avatar based at least in part on the spatial relationships between the first virtual avatar and other virtual avatars of the collection of virtual avatars;
dynamically generates a video stream for the first virtual avatar based at least in part on the field-of-view region and the spatial relationships between the first virtual avatar and other virtual avatars of the collection of virtual avatars; and
communicate the audio stream and video stream to the first client connection, wherein the first client connection is associated with the first virtual avatar, wherein an audio device produces audio associated with the audio stream, and wherein a display device displays a video image associated with the video stream.

13. A computing system of a telepresence management system, the computing system comprising:
memory; and
one or more processors coupled to the memory and configured to:
receive an indication that a first client connection in combination with a set of client connections forms a first conversation cluster within an extended reality telepresence session, wherein the extended reality telepresence session comprises a plurality of client connections hosted by a plurality of servers, wherein the plurality of client connections includes the first client connection and the set of client connections;
generate a first server allocation map, wherein the first server allocation map indicates an assignment of at least one server of the plurality of servers to each client connection of the plurality of client connections, wherein the first server allocation map indicates an assignment of more servers of the plurality of servers to other client connections of the first conversation cluster than the first client connection;
allocate the plurality of client connections to the plurality of servers based on the first server allocation map; and
based on a map transition policy, transition from the first server allocation map to a second server allocation map, wherein based on the transitioning, the plurality of client connections are allocated to the plurality of servers based on the second server allocation map, wherein the second server allocation map indicates an assignment of fewer servers of the plurality of servers to the other client connections of the first conversation cluster than the first server allocation map,
wherein a first server generates an audio stream for a first avatar based on spatial relationships between the first avatar and other avatars in a telepresence environment of the extended reality telepresence session, generates a video stream for the first avatar based on a field-of-view of the first avatar; and communicates the audio stream and video stream to the first client connection, wherein the first client connection is associated with the first avatar.

14. Non-transitory computer readable media comprising computer-executable instructions that, when executed by a computing system of a data intake and query system, cause the computing system to:
receive an indication that a first client connection in combination with a set of client connections forms a first conversation cluster within an extended reality telepresence session, wherein the extended reality telepresence session comprises a plurality of client connections hosted by a plurality of servers, wherein the plurality of client connections includes the first client connection and the set of client connections;
generate a first server allocation map, wherein the first server allocation map indicates an assignment of at least one server of the plurality of servers to each client connection of the plurality of client connections, wherein the first server allocation map indicates an assignment of more servers of the plurality of servers to other client connections of the first conversation cluster than the first client connection;
allocate the plurality of client connections to the plurality of servers based on the first server allocation map; and
based on a map transition policy, transition from the first server allocation map to a second server allocation map, wherein based on the transitioning, the plurality of client connections is allocated to the plurality of servers based on the second server allocation map, wherein the second server allocation map allocates a first server to the first client connection and indicates an assignment of fewer servers of the plurality of servers to the other client connections of the first conversation cluster than the first server allocation map, wherein the first server:
- determines spatial relationships between at least some virtual avatars of a collection of virtual avatars in the extended reality telepresence session, wherein the extended reality telepresence session is an immersive extended reality 3D environment allowing real-time audiovisual interactions between two or more virtual avatars of the collection of virtual avatars;
- identifies a field-of-view region in a telepresence environment that corresponds to a field-of-view region of a first virtual avatar of the collection of virtual avatars;
- dynamically generates an audio stream for the first virtual avatar based at least in part on the spatial relationships between the first virtual avatar and other virtual avatars of the collection of virtual avatars;
- dynamically generates a video stream for the first virtual avatar based at least in part on the field-of-view region and the spatial relationships between the first virtual avatar and other virtual avatars of the collection of virtual avatars; and
- communicates the audio stream and video stream to the first client connection, wherein the first client connection is associated with the first virtual avatar, wherein an audio device produces audio associated with the audio stream, and wherein a display device displays a video image associated with the video stream.

15. The method of claim 1, wherein the first server generates an audio stream for a first avatar based on spatial relationships between the first avatar and other avatars in a telepresence environment of the extended reality telepresence session, generates a video stream for the first avatar based on a field-of-view of the first avatar; and communicates the audio stream and video stream to the new client connection, wherein the new client connection is associated with the first avatar.

16. The computing system of claim 13, wherein the first server is configured to:
- determine spatial relationships between at least some virtual avatars of a collection of virtual avatars in the extended reality telepresence session, wherein the extended reality telepresence session is an immersive extended reality 3D environment allowing real-time audiovisual interactions between two or more virtual avatars of the collection of virtual avatars;
- identify a field-of-view region in the telepresence environment that corresponds to a field-of-view region of a first virtual avatar of the collection of virtual avatars;
- dynamically generates an audio stream for the first virtual avatar based at least in part on the spatial relationships between the first virtual avatar and other virtual avatars of the collection of virtual avatars;
- dynamically generates a video stream for the first virtual avatar based at least in part on the field-of-view region and the spatial relationships between the first virtual avatar and other virtual avatars of the collection of virtual avatars; and
- communicate the audio stream and video stream to the first client connection, wherein the first client connection is associated with the first virtual avatar, wherein an audio device produces audio associated with the audio stream, and wherein a display device displays a video image associated with the video stream.

\* \* \* \* \*